US009724606B2

(12) United States Patent
Lai et al.

(10) Patent No.: US 9,724,606 B2
(45) Date of Patent: Aug. 8, 2017

(54) SYSTEMS AND METHODS FOR INDICATING POSITIONS OF SELECTED SYMBOLS IN A TARGET SEQUENCE

(71) Applicant: Zynga Inc., San Francisco, CA (US)

(72) Inventors: Peter Pao Lai, South San Francisco, CA (US); Sora Bai, San Francisco, CA (US); David Baack, Daly City, CA (US); Katherine Lee, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 357 days.

(21) Appl. No.: 14/480,983

(22) Filed: Sep. 9, 2014

(65) Prior Publication Data

US 2016/0067605 A1 Mar. 10, 2016

(51) Int. Cl.
*A63F 9/24* (2006.01)
*A63F 13/00* (2014.01)
*G06F 17/00* (2006.01)
*G06F 19/00* (2011.01)
*A63F 13/537* (2014.01)
*A63F 13/30* (2014.01)

(52) U.S. Cl.
CPC ............ *A63F 13/537* (2014.09); *A63F 13/30* (2014.09)

(58) Field of Classification Search
USPC ................................. 463/1, 5, 20, 22, 25, 30
See application file for complete search history.

(56) References Cited

U.S. PATENT DOCUMENTS

| 9,272,208 B1 | 3/2016 | Letourneau et al. |
| 2004/0053665 A1* | 3/2004 | Baerlocher ......... G07F 17/3267 463/16 |
| 2004/0121838 A1* | 6/2004 | Hughs-Baird .......... G07F 17/32 463/25 |
| 2007/0054717 A1 | 3/2007 | Youm et al. |
| 2016/0067613 A1 | 3/2016 | Ntoulas et al. |
| 2016/0256775 A1 | 9/2016 | Gustafson et al. |

OTHER PUBLICATIONS

"U.S. Appl. No. 14/601,807, First Action Interview—Pre-Interview Communication mailed Nov. 1, 2016", 4 pgs.
"U.S. Appl. No. 14/601,807, Response filed Dec. 15, 2016 to First Action Interview—Pre-Interview Communication mailed Nov. 1, 2016", 9 pgs.

* cited by examiner

*Primary Examiner* — Adetokunbo O Torimiro
(74) *Attorney, Agent, or Firm* — Schwegman Lundberg & Woessner

(57) ABSTRACT

A system, a machine-readable storage medium storing instructions, and a computer-implemented method are described herein to display positions of symbols in a target sequence. In various embodiments, a Sequence Generator generates a target sequence of symbols to be identified by a player in a virtual gaming environment. The Sequence Generator generates an obscured display of the target sequence. The Sequence Generator receives from the player a first selected sequence of symbols to be played in a first game move in the virtual gaming environment. The Sequence Generator identifies a first shared symbol present in both the first selected sequence and the target sequence. Responsive to the identifying, the Sequence Generator changes the obscured display of the target sequence to reveal the first shared symbol at a first position in the target sequence.

20 Claims, 10 Drawing Sheets

SYSTEMS AND METHODS FOR INDICATING POSITIONS OF SELECTED SYMBOLS IN A TARGET SEQUENCE

TECHNICAL FIELD

The present disclosure generally relates to games and applications in general and, in particular embodiments, to displaying positions of symbols in a sequence.

BACKGROUND

In many games, there is a virtual world or some other imagined playing space where a player/user of the game controls one or more player characters (herein "character," "player character," or "PC"). Player characters can be considered in-game representations of the controlling player. As used herein, the terms "player," "user," "entity," and "friend" may refer to the in-game player character controlled by that player, user, entity, or friend, unless context suggests otherwise. The game display can display a representation of the player character. A game engine accepts inputs from the player, determines player character actions, decides outcomes of events and presents the player with a game display illuminating what happened. In some games, there are multiple players, wherein each player controls one or more player characters.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, etc. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

An electronic social networking system typically operates with one or more social networking servers providing interaction between users such that a user can specify other users of the social networking system as "friends." A collection of users and the "friend" connections between users can form a social graph that can be traversed to find second, third and more remote connections between users, much like a graph of nodes connected by edges can be traversed.

Many online computer games are operated on an online social networking system. Such an online social networking system allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Firefox, Chrome, Internet Explorer).

DETAILED DESCRIPTION

Figure 1:
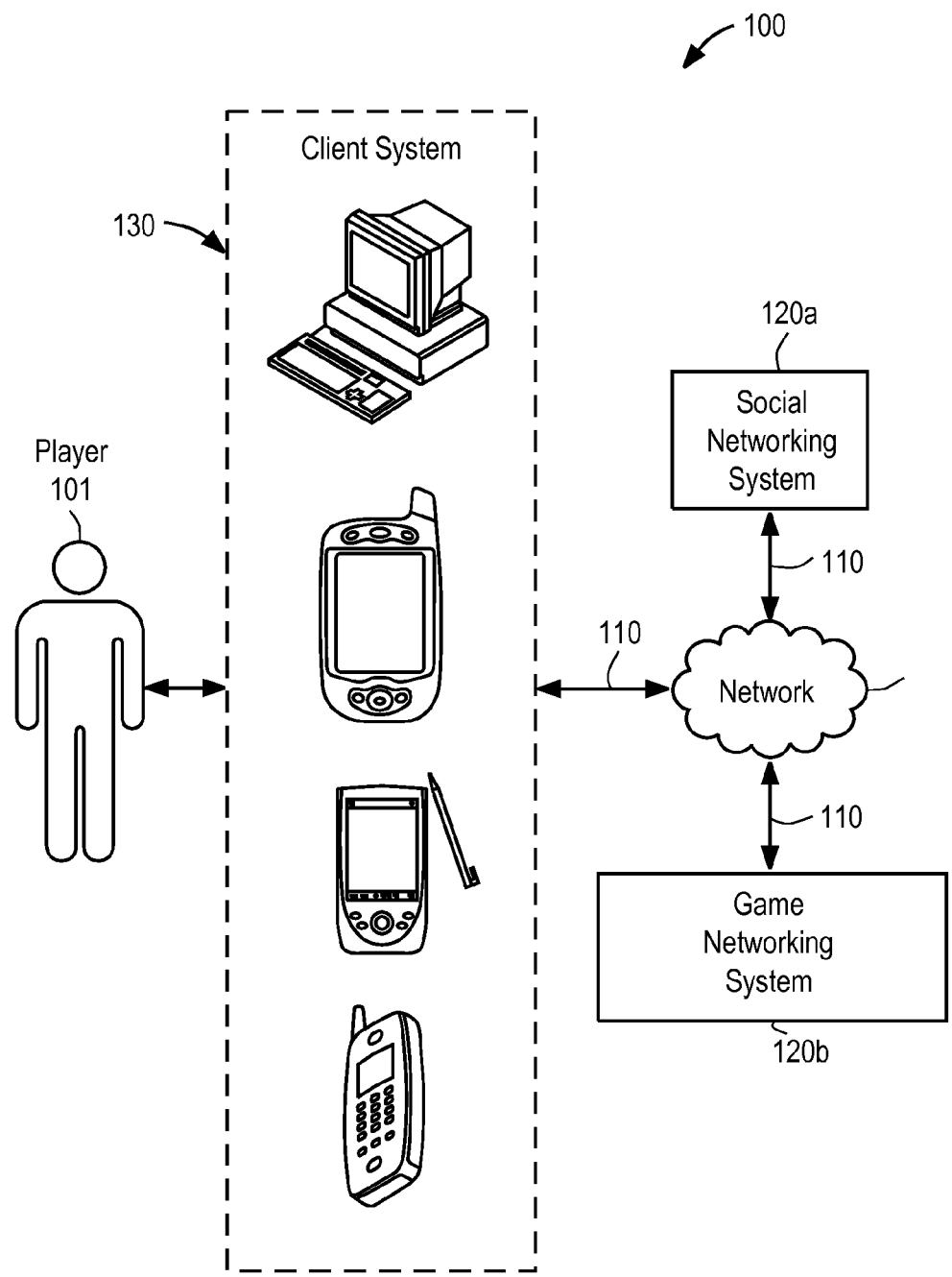
FIG. 1 is a schematic diagram showing an example of a system, according to some example embodiments.

A system, a machine-readable storage medium storing instructions, and a computer-implemented method are described herein to display positions of symbols in a target sequence. In the following description, for purposes of explanation, numerous specific details are set forth in order to provide a thorough understanding of example embodiments. It will be evident, however, to one skilled in the art that the present technology may be practiced without these specific details.

A system, a machine-readable storage medium storing instructions, and a computer-implemented method are described herein to display positions of symbols in a target sequence. In various embodiments, a Sequence Generator generates a target sequence of symbols to be identified by a player in a virtual gaming environment. The Sequence Generator generates an obscured display of the target sequence. The Sequence Generator receives from the player a first selected sequence of symbols to be played in a first game move in the virtual gaming environment. The Sequence Generator identifies a first shared symbol present in both the first selected sequence and the target sequence. Responsive to the identifying, the Sequence Generator changes the obscured display of the target sequence to reveal the first shared symbol at a first position in the target sequence.

In various embodiments, a virtual gaming environment includes the Sequence Generator and displays a plurality of icons. Each icon represents a particular symbol, such as a letter. In some embodiments, each icon represents a different letter. In other embodiments, some of the icons display the same letter. The Sequence Generator generates a target sequence of symbols which, in some embodiments, is a target phrase comprising one or more words. Display of the target sequence in the virtual gaming environment is obscured such that a position of each symbol is visible, but the type of symbol at each position is not visible. For example, in some embodiments, display of the target sequence is obscured such that a number of words and a position of each letter in the target sequence is visible to the player, but which type of letter at each position is not discernable by the player.

For a game move, the player selects icons according to a sequence of symbols that form a word. The Sequence Generator accesses storage that includes a listing of pre-defined words. Each icon in the virtual gaming environment is a candidate for being selected by the player according to a sequence that forms a respective word that may or may not be included in the listing of pre-defined words. Upon determining the selected sequence forms a word that is in the listing of pre-defined words, the player is given an in-game reward in the virtual gaming environment.

The Sequence Generator analyzes the selected sequence to identify whether a shared symbol is present in both the selected sequence and the target sequence. Upon determining the presence of the shared symbol in both the selected sequence and the target sequence, the Sequence Generator updates the obscured display of the target sequence so as to reveal the shared symbol at a particular position in the target sequence. The updated displayed of the target sequence concurrently displays the shared symbol while displaying positions of the remaining symbols in the target sequence—but obscuring display of the remaining symbols.

The Sequence Generator removes the icons selected by the player. The Sequence Generator identifies an update symbol for each symbol represented by a removed icon. In some embodiments, each update symbol represents a different letter. In other embodiments, some of the update symbols represent the same letter. The Sequence Generator creates an icon for each update symbol and inserts each newly-created icon into the virtual gaming environment. It is understood that each newly-created icon inserted into the virtual gaming environment is a candidate for being selected by the player according to a sequence that forms a respective word that may or may not be included in the listing of pre-defined words.

It is understood that various embodiments include the generation of modules to cause any component(s) of a social networking system, game networking system (i.e. online gaming system) and/or a client system to perform any and all of the actions, operations and steps described herein. It is further understood that, in various embodiments, any of the one or more modules may comprise source code that, when compiled by a computing device(s), creates object code that causes the computing device(s) to perform the various actions, operations and steps described herein.

It is further understood that embodiments described herein are not limited to being implemented with online games, but rather, can be implemented for any kind of online environment.

Social Network Systems and Game Networking Systems

FIG. 1 illustrates an example of a system for implementing various disclosed embodiments. In particular embodiments, system 100 comprises player 101, social networking system 120a, game networking system 120b (i.e. online gaming system), client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 120a (i.e. social network system) is a network-addressable computing system that can host one or more social graphs. Social networking system 120a can generate, store, receive, and transmit social networking data. Social networking system 120a can be accessed by the other components of system 100 either directly or via network 160. Game networking system 120b is a network-addressable computing system that can host one or more online games. Game networking system 120b can generate, store, receive, and transmit game-related data, such as, for example, game account data, game input, game state data, and game displays. Game networking system 120b can be accessed by the other components of system 100 either directly or via network 160. Player 101 may use client system 130 to access, send data to, and receive data from social networking system 120a and game networking system 120b. Client system 130 can access social networking system 120a or game networking system 120b directly, via network 160, or via a third-party system. As an example and not by way of limitation, client system 130 may access game networking system 120b via social networking system 120a. Client system 130 can be any suitable computing device, such as a personal computer, laptop, cellular phone, smart phone, computing tablet, etc.

Although FIG. 1 illustrates a particular number of players 101, social network systems 120a, game networking systems 120b, client systems 130, and networks 160, this disclosure contemplates any suitable number of players 101, social network systems 120a, game networking systems 120b, client systems 130, and networks 160. As an example and not by way of limitation, system 100 may include one or more game networking systems 120b and no social networking systems 120a. As another example and not by way of limitation, system 100 may include a system that comprises both social networking system 120a and game networking system 120b. Moreover, although FIG. 1 illustrates a particular arrangement of player 101, social networking system 120a, game networking system 120b, client system 130, and network 160, this disclosure contemplates any suitable arrangement of player 101, social networking system 120a, game networking system 120b, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 120a, game networking system 120b, client system 130, and network 160, this disclosure contemplates any suitable connections between player 101, social networking system 120a, game networking system 120b, client system 130, and network 160. As an example and not by way of limitation, in particular embodiments, client system 130 may have a direct connection to social networking system 120a or game networking system 120b, bypassing network 160.

Online Games and Game Systems

Game Networking Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages game state, including player character state for currently active (online) and inactive (offline) players.

An online game can be hosted by game networking system 120b (i.e. online gaming system), which includes a Notification Generator 150 that performs operations according to embodiments as described herein. The game networking system 120b can be accessed using any suitable connection with a suitable client system 130. A player may have a game account on game networking system 120b, wherein the game account can contain a variety of information associated with the player (e.g., the player's personal information, financial information, purchase history, player character state, game state). In some embodiments, a player may play multiple games on game networking system 120b, which may maintain a single game account for the player with respect to all the games, or multiple individual game accounts for each game with respect to the player. In some embodiments, game networking system 120b can assign a unique identifier to each player 101 of an online game hosted on game networking system 120b. Game networking system 120b can determine that a player 101 is accessing the online game by reading the user's cookies, which may be appended to HTTP requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmitting user inputs or other events to the game engine, and receive instructions from the game engine. The game engine can be executed on any suitable system (such as, for example, client system 130, social networking system 120a, or game networking system 120b). As an example and not by way of limitation, client system 130 can download client components of an online game, which are executed locally, while a remote game server, such as game networking system 120b, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120b.

Storing Game-Related Data

A database may store any data relating to game play within a game networking system 120b. The database may include database tables for storing a player game state that may include information about the player's virtual gameboard, the player's character, or other game-related information. For example, player game state may include virtual objects owned or used by the player, placement positions for virtual structural objects in the player's virtual gameboard, and the like. Player game state may also include in-game obstacles of tasks for the player (e.g., new obstacles, current obstacles, completed obstacles, etc.), the player's character attributes (e.g., character health, character energy, amount of coins, amount of cash or virtual currency, etc.), and the like.

The database may also include database tables for storing a player profile that may include user-provided player information that is gathered from the player, the player's client device, or an affiliate social network. The user-provided player information may include the player's demographic information, the player's location information (e.g., a historical record of the player's location during game play as determined via a GPS-enabled device or the internet protocol (IP) address for the player's client device), the player's localization information (e.g., a list of languages chosen by the player), the types of games played by the player, and the like.

In some example embodiments, the player profile may also include derived player information that may be determined from other information stored in the database. The derived player information may include information that indicates the player's level of engagement with the virtual game, the player's friend preferences, the player's reputation, the player's pattern of game-play, and the like. For example, the game networking system 120b may determine the player's friend preferences based on player attributes that the player's first-degree friends have in common, and may store these player attributes as friend preferences in the player profile. Furthermore, the game networking system 120b may determine reputation-related information for the player based on user-generated content (UGC) from the player or the player's $N^{th}$ degree friends (e.g., in-game messages or social network messages), and may store this reputation-related information in the player profile. The derived player information may also include information that indicates the player's character temperament during game play, anthropological measures for the player (e.g., tendency to like violent games), and the like.

In some example embodiments, the player's level of engagement may be indicated from the player's performance within the virtual game. For example, the player's level of engagement may be determined based on one or more of the following: a play frequency for the virtual game or for a collection of virtual games; an interaction frequency with other players of the virtual game; a response time for responding to in-game actions from other players of the virtual game; and the like.

In some example embodiments, the player's level of engagement may include a likelihood value indicating a likelihood that the player may perform a desired action. For example, the player's level of engagement may indicate a likelihood that the player may choose a particular environment, or may complete a new challenge within a determinable period of time from when it is first presented to him.

In some example embodiments, the player's level of engagement may include a likelihood that the player may be a leading player of the virtual game (a likelihood to lead). The game networking system 120b may determine the player's likelihood to lead value based on information from other players that interact with this player. For example, the game networking system 120*b* may determine the player's likelihood to lead value by measuring the other players' satisfaction in the virtual game, measuring their satisfaction from their interaction with the player, measuring the gameplay frequency for the other players in relation to their interaction frequency with the player (e.g., the ability for the player to retain others), and/or the like.

The game networking system 120*b* may also determine the player's likelihood to lead value based on information about the player's interactions with others and the outcome of these interactions. For example, the game networking system 120*b* may determine the player's likelihood to lead value by measuring the player's amount of interaction with other players (e.g., as measured by a number of challenges that the player cooperates with others, and/or an elapsed time duration related thereto), the player's amount of communication with other players, the tone of the communication sent or received by the player, and/or the like. Moreover, the game networking system 120*b* may determine the player's likelihood to lead value based on determining a likelihood for the other players to perform a certain action in response to interacting or communicating with the player and/or the player's virtual environment.

Game Systems, Social Networks, and Social Graphs:

In an online multiplayer game, players may control player characters (PCs), a game engine controls non-player characters (NPCs) and game features, and the game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), etc. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within $N_{max}$ degrees of the player, where $N_{max}$ is the maximum degree of separation allowed by the system managing the social graph (such as, for example, social networking system 120a or game networking system 120b). In one embodiment, $N_{max}$ equals 1, such that the player's social network includes only first-degree friends. In another embodiment, $N_{max}$ is unlimited and the player's social network is coextensive with the social graph.

In particular embodiments, the social graph is managed by game networking system 120b, which is managed by the game operator. In other embodiments, the social graph is part of a social networking system 120a managed by a third-party (e.g., Facebook, Friendster, Myspace). In yet other embodiments, player 101 has a social network on both game networking system 120b and social networking system 120a, wherein player 101 can have a social network on the game networking system 120b that is a subset, superset, or independent of the player's social network on social networking system 120a. In such combined systems, game network system 120b can maintain social graph information with edge type attributes that indicate whether a given friend is an "in-game friend," an "out-of-game friend," or both. The various embodiments disclosed herein are operable when the social graph is managed by social networking system 120a, game networking system 120b, or both.

Figure 2:
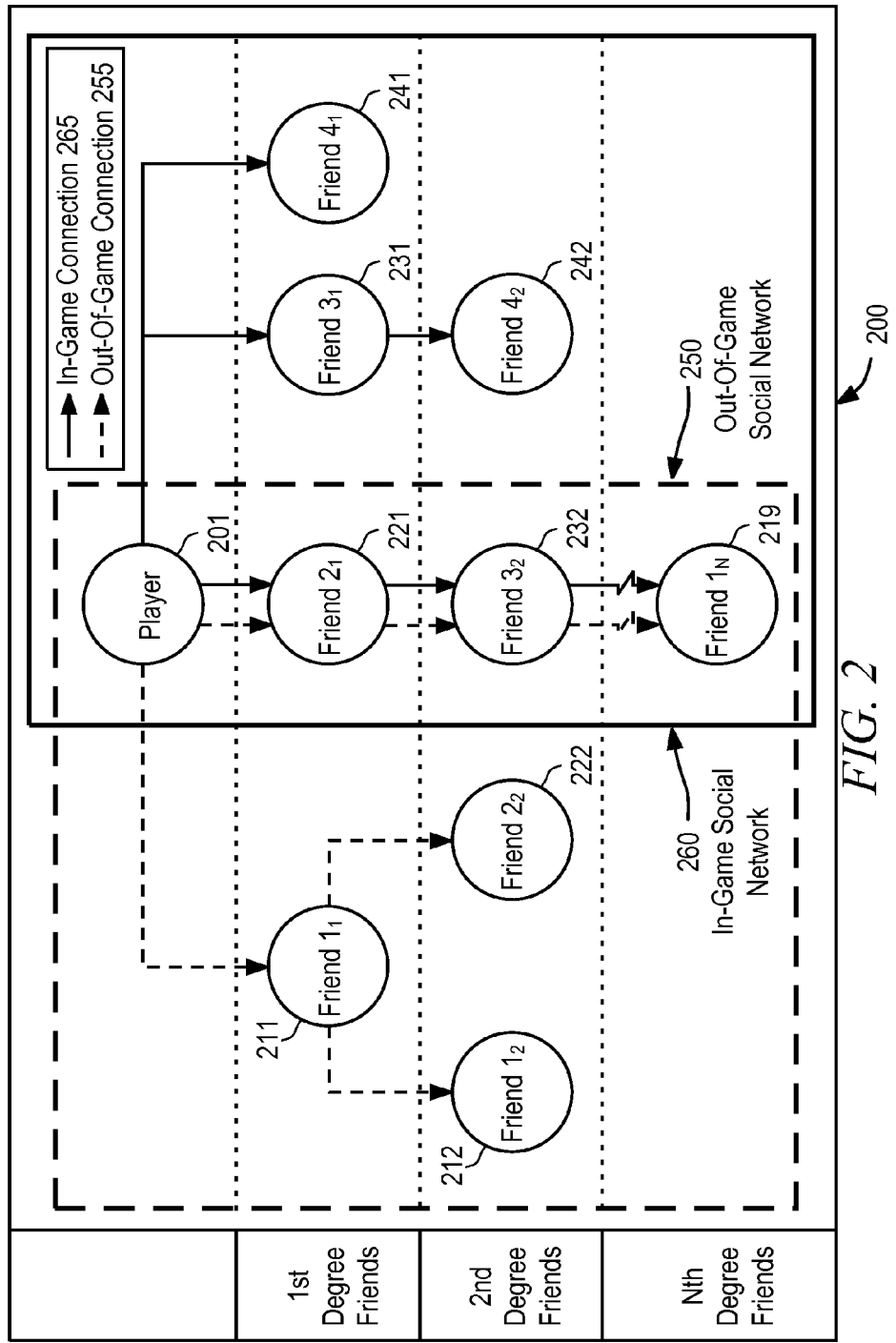
FIG. 2 is a schematic diagram showing an example of a social network within a social graph, according to some embodiments.

FIG. 2 shows an example of a social network within a social graph. As shown, Player 201 can be associated, connected or linked to various other users, or "friends," within the social network 250. These associations, connections or links can track relationships between users within the social network 250 and are commonly referred to as online "friends" or "friendships" between users. Each friend or friendship in a particular user's social network within a social graph is commonly referred to as a "node." For purposes of illustration and not by way of limitation, the details of social network 250 will be described in relation to Player 201. As used herein, the terms "player," "user," and "account" can be used interchangeably and can refer to any user or character in an online game networking system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to which he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 120a.

In various embodiments, Player 201 can have Nth-degree friends connected to him through a chain of intermediary degree friends as indicated in FIG. 2. For example, Nth-degree Friend $1_N$ 219 is connected to Player 201 via second-degree Friend $3_2$ 232 and one or more other higher-degree friends. Various embodiments may take advantage of and utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out of game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network, but a first-degree friend in Player 201's in-game social network. In particular embodiments, a game engine can access in-game social network 260, out-of-game social network 250, or both.

In particular embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Figure 3:
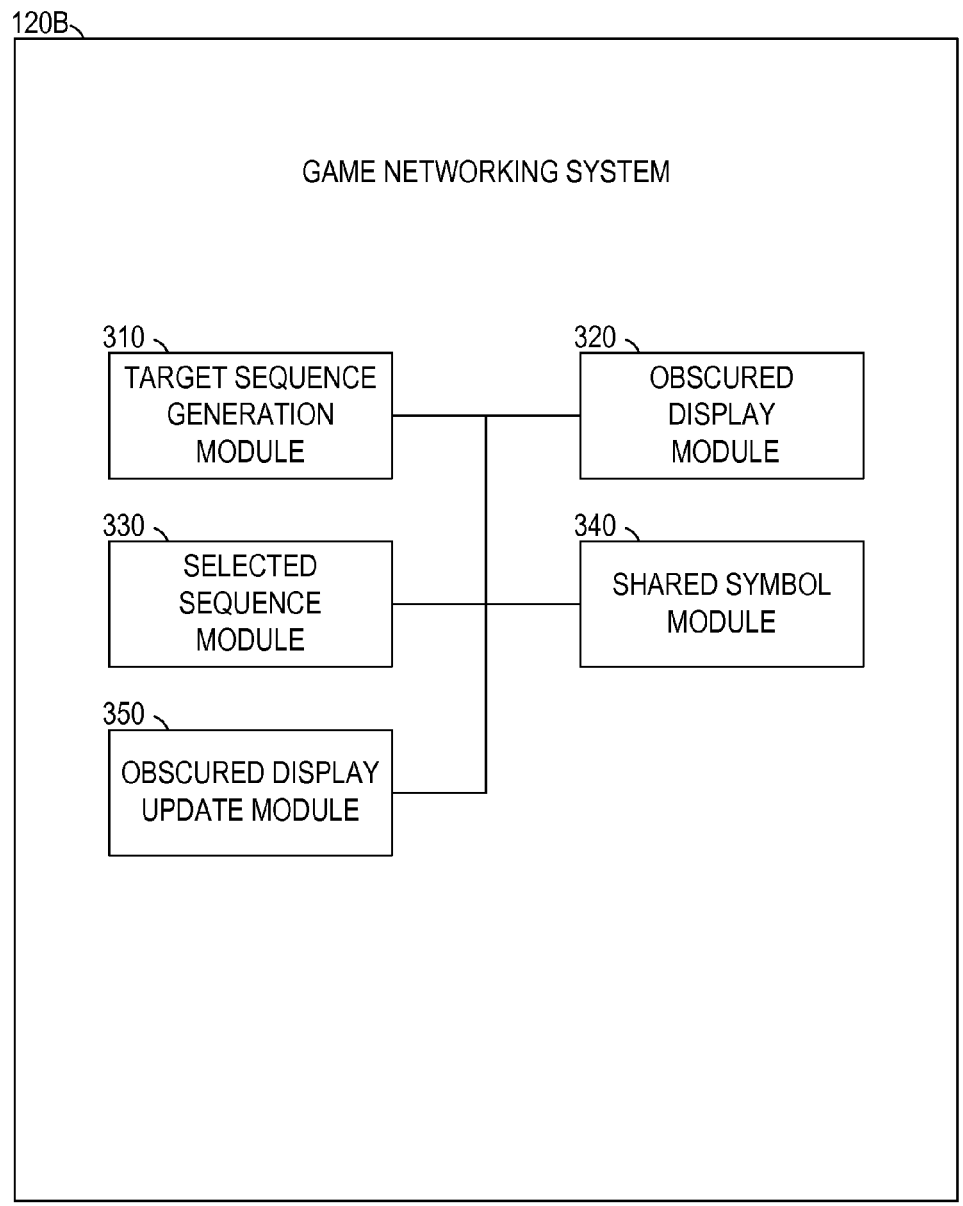
FIG. 3 is a block diagram illustrating components of a computing device, according to some example embodiments.

FIG. 3 is a block diagram illustrating components of a game networking system, according to some example embodiments. The game networking system 120b may include a target sequence generations module 310, an obscured display module 320, a selected sequence module 330, a shared symbol module 340 and an obscured display updated module 350.

In various example embodiments, the target sequence generator module 310 is a hardware-implemented module that controls, manages and stores information related to generating a target sequence of symbols. The target sequence generator module 310 generates a target sequence of symbols. In some embodiments, the target sequence generator module 310 accesses a pre-defined listing of words and determines a target phrase based on a plurality of words from the pre-defined listing of words. The target sequence generator module 310 associates a reward with the target sequence of symbols. The reward will be provided to the player based on the player solving the target sequence of symbols.

In various example embodiments, the obscured display module 320 is a hardware-implemented module that controls, manages and stores information related to obscuring a display of one or more symbols of the target sequence of symbols. The obscured display module 320 creates an obscured display of the target sequence of symbols in which a position of each symbol is visible—but display of each respective symbol is obscured.

In various example embodiments, the selected sequence module 330 is a hardware-implemented module that controls, manages and stores information related to receiving a sequence of symbols selected by a player during a game move. The selected sequence module 330 accesses the pre-defined listing of words and determines whether the selected sequence of symbols matches a respective word in the pre-defined listing of words. Due to identifying a match, the selected sequence module 330 triggers providing an award to the player based on the selected sequence of symbols.

In various example embodiments, the shared symbol module 340 may be a hardware-implemented module that controls, manages and stores information related to identifying one or more symbols present in both the selected sequence of symbols and the target sequence of symbols. The shared symbol module 340 determines whether a shared symbol(s) is present in the selected sequence and the target sequence. In some embodiments, the shared symbol(s) are one more letters.

In various example embodiments, the obscured display update module 350 is a hardware-implemented module that controls, manages and stores information related to revealing a position of a shared symbol in the target sequence. The obscured display update module 350 updates a current display of the target sequence by revealing a position of the shared symbol in the target sequence while maintaining an obscured display of the positions of the remaining symbols in the target sequence.

The modules 310-350 are configured to communicate with each other (e.g., via a bus, shared memory, or a switch). Any one or more of the modules 310-350 described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Displaying Positions of Selected Symbols in a Target Sequence

Figure 4:
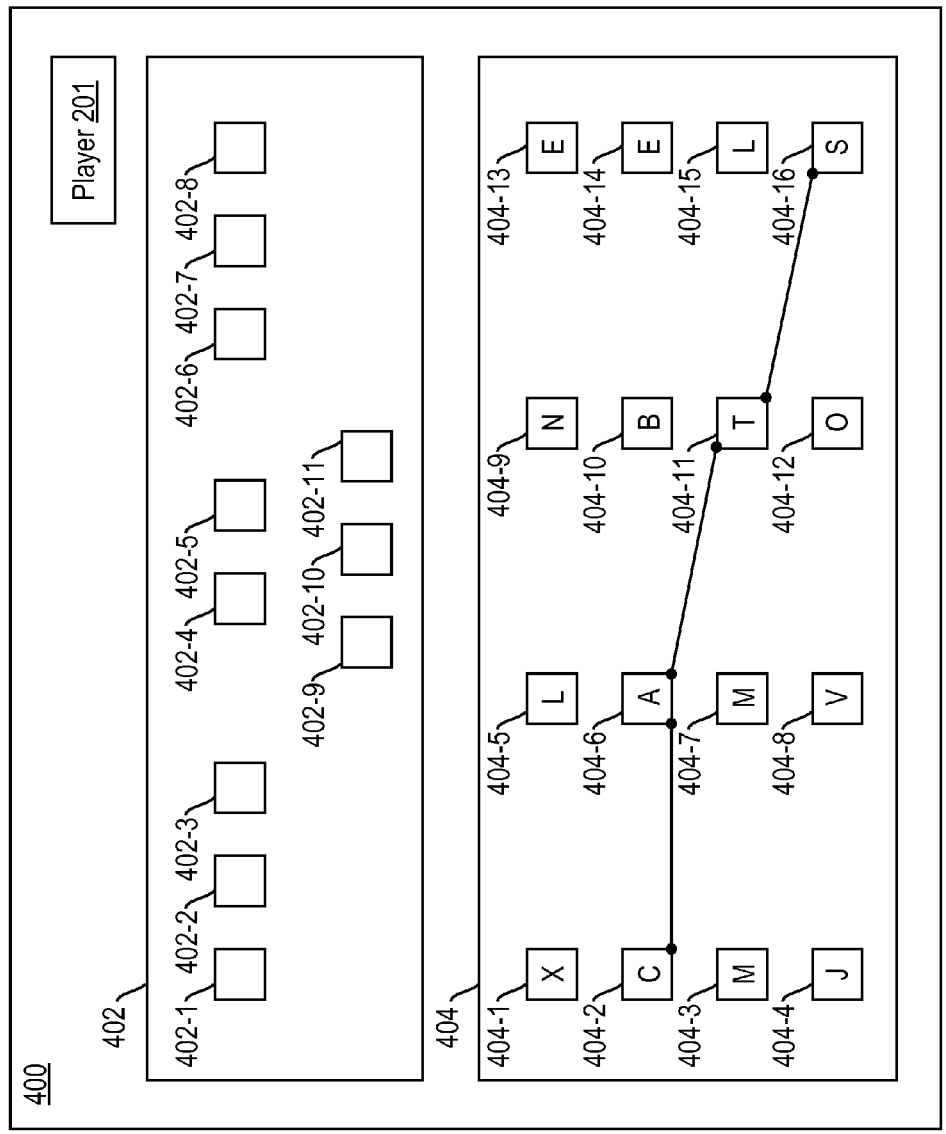
FIG. 4 is a block diagram illustrating a selected sequence of symbols in a game and an obscured display of a target sequence of symbols, according to some embodiments.

FIG. 4 is a block diagram illustrating a selected sequence of symbols in a game and an obscured display of a target sequence of symbols. The Sequence Generator determines a target sequence of symbols, which is displayed in a target sequence display area 402 of a first instance of a virtual gaming environment 400 associated with game play of Player 201. The target sequence is a target phrase that includes a plurality of words having letters at positions 402-1 . . . 402-11 in the target phrase. For example, the target phrase, as illustrated in FIG. 4, includes a first word with three letters at positions 402-1, 402-2, 402-3, a second word with two letters at positions 402-4, 402-5, a third word with three letters at positions 402-6, 402-7, 402-8 and a fourth word with three letters at positions 402-9, 402-10, 402-11. The target phrase is "CAT IN THE HAT."

The first instance of the virtual gaming environment 400 includes a grouping 404 of selectable symbols 404-1, 404-2, 404-3, 404-4, 404-5, 404-6, 404-7, 404-8, 404-9, 404-10, 404-11, 404-12, 404-13, 404-14, 404-15, 404-16. In some embodiments, each symbol 404-1 . . . 404-16 represents a letter. Each symbol 404-1 . . . 404-16 can be selected as being part of a sequence selected symbols to form a word. For example, in one embodiment, the Sequence Generator receives input representative of the Player 201 tracing a path through symbols 404-2, 404-6, 404-11 and 404-16 in order to define a selected sequence of symbols that forms the word "CATS." In some embodiments, the received input is received via a touch screen below which the first instance of the virtual gaming environment 400 is displayed.

The Sequence Generator determines that the selected sequence is a valid word. For example, the Sequence Generator accesses a listing of pre-defined valid words and validates that "CATS" appears in the listing. Based on validating the selected sequence, the Sequence Generator triggers providing an award to the Player 201.

It is understood that, in some embodiment, the pre-defined listing of valid words can be updated by removing and/or adding words. Words are added and/or removed from the pre-defined listing of valid words based at least one of a game level at which the Player 201 is currently playing and one or more previously-selected sequences received from the Player 201.

Figure 5:
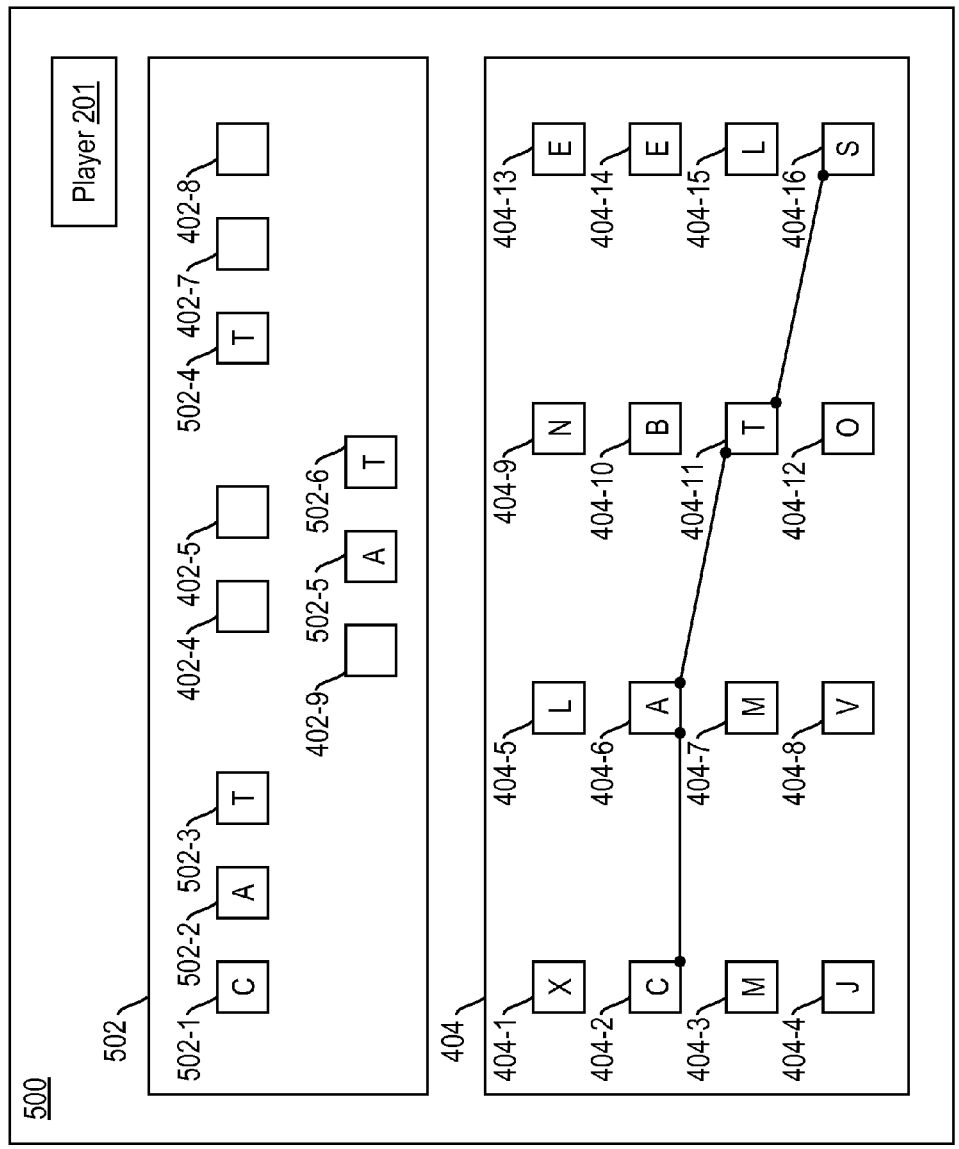
FIG. 5 is a block diagram illustrating an updated obscured display of a target sequence of symbols, according to some embodiments.

FIG. 5 is a block diagram illustrating an updated obscured display of a target sequence of symbols, according to some embodiments. The Sequence Generator determines that there are shared letters between the target phrase "CAT IN THE HAT" and the selected sequence "CATS". Specifically, the Sequence Generator determines that the letter "C" is present at position 402-1 in the target phrase, the letter "A" is present at positions 402-2, 402-10, and the letter "T" is present at positions 402-3, 402-6, 402-11.

The Sequence Generator generates an updated target sequence display area 502 in a second instance of the virtual gaming environment 500. The updated target sequence display area 502 includes concurrent display of the shared letters at positions 502-1, 502-2, 502-3, 502-4, 502-5 and 502-6. The updated target sequence display area 502 also maintains an obscured display of letters of the target phrase at positions 402-4, 402-5, 402-7, 402-8 and 402-9.

Figure 6:
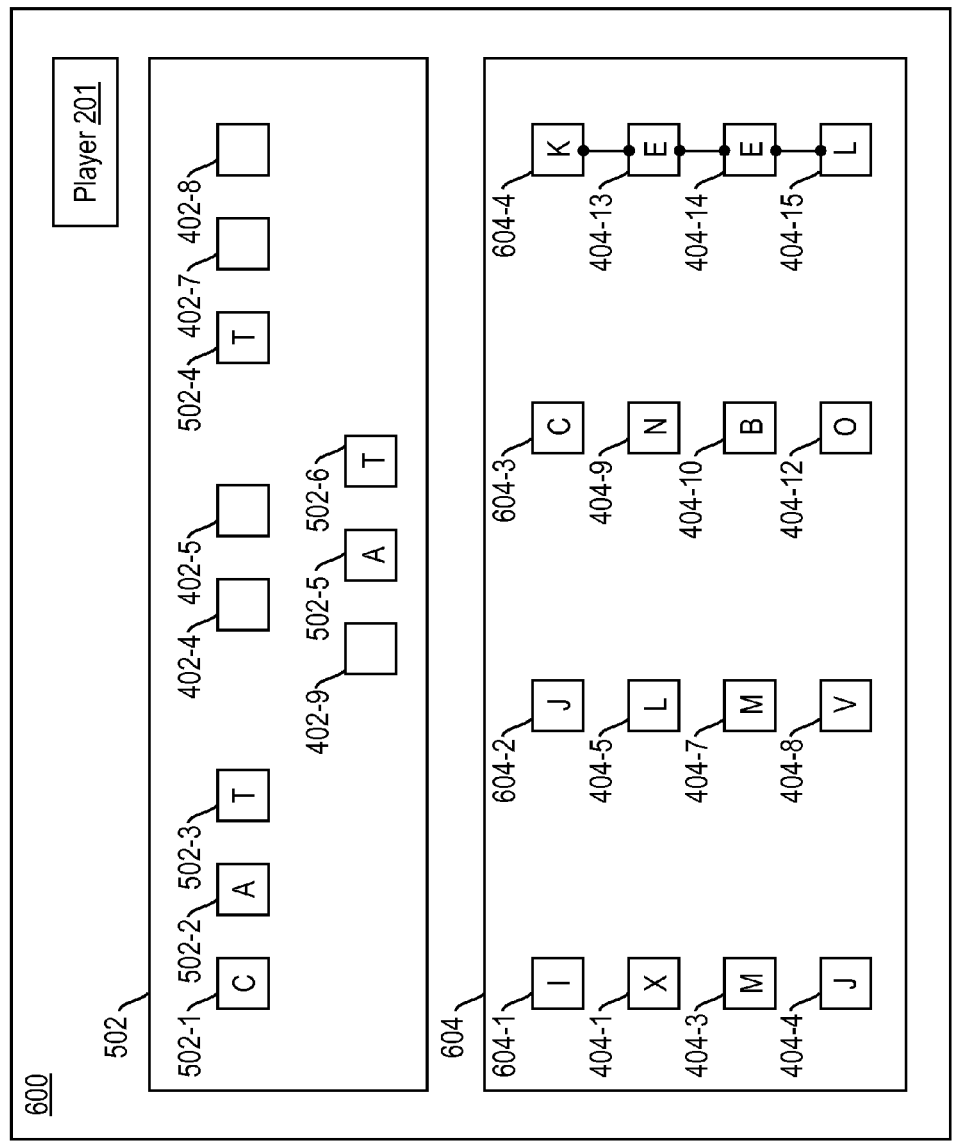
FIG. 6 is a block diagram illustrating an updated display of a grouping of selectable symbols, according to some embodiments.

FIG. 6 is a block diagram illustrating an updated display of a grouping of selectable symbols, according to some embodiments. The Sequence Generator generates an updated display of a grouping of selectable symbols 604 for a third instance of the virtual gaming environment 600. For each selected symbol 404-2, 404-6, 404-11, 404-16, the Sequence Generator identifies a respective update symbol 604-1, 604-1, 604-3, 604-4.

In some embodiments, the Sequence Generator generates the updated display of a grouping of selectable symbols 604 by removing display of the selected symbols 404-2, 404-6, 404-11, 404-16. In some embodiments, removal of each selected symbol 404-2, 404-6, 404-11, 404-16 includes display of each selected symbol 404-2, 404-6, 404-11, 404-16 gradually disappearing. In addition, in various embodiments, removal of selected symbol 404-2 includes display of an animated shift of symbol 404-1 from its original display position to the selected symbol's 404-2 position. Removal of selected symbol 404-6 includes display of an animated shift of symbol 404-5 from its original display position to the selected symbol's 404-6 position.

Removal of selected symbol 404-11 includes display of an animated shift of symbol 404-10 from its original display position to the selected symbol's 404-11 position. Another animated shift is displayed whereby selectable symbol 404-9 is moved from its original position to the original position of 404-10.

Removal of selected symbol 404-16 includes display of an animated shift of symbol 404-15 from its original display position to the selected symbol's 404-16 position. Another animated shift is displayed whereby selectable symbol 404-14 is moved from its original position to the original position of 404-15. Yet another animated shift is displayed whereby selectable symbol 404-13 is moved from its original position to the original position of 404-14.

The Sequence Generator also generates a display of an animated insertion of each update symbol 604-1, 604-1, 604-3, 604-4 into the respective original display positions of selectable symbols 404-1, 404-5, 404-9, 404-13. Upon displaying the updated display of a grouping of selectable symbols 604 with the update symbols 604-1, 604-1, 604-3, 604-4, the Sequence Generator receives a selected sequence of symbols based on the Player 201 tracing a path through symbols 604-4, 404-13, 404-14 and 404-15.

Figure 7:
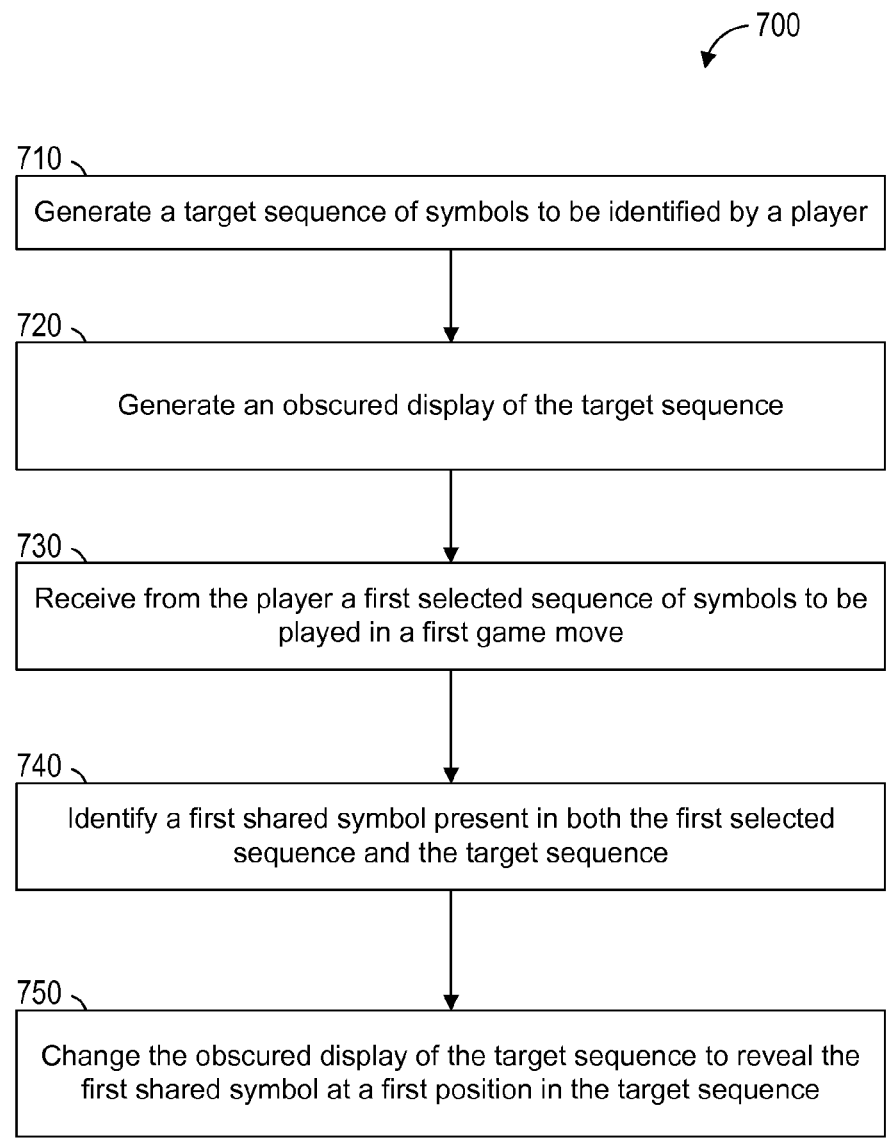
FIG. 7 is a flowchart 700 showing an example method of changing an obscured display of a target sequence, according to some example embodiments.

FIG. 7 is a flowchart 700 showing an example method of changing an obscured display of a target sequence, according to some example embodiments.

At operation 710, the Sequence Generator generates a target sequence of symbols to be identified by a player in a computer-implemented game. In some embodiments, the target sequence includes one or more words. In other embodiments, the target sequence includes a particular combination of various types of in-game virtual objects.

At operation 720, the Sequence Generator generates an obscured display of the target sequence. In some embodiments, the Sequence Generator generates the obscured display of the target sequence in order to indicate a position of each symbol in the target sequence—however each symbol is not visible. In other embodiments, the Sequence Generator generates the obscured display of the target sequence in order to indicate a position of each in-game virtual object in the target sequence—however a respective type in-game virtual object is not visible.

At operation 730, the Sequence Generator receives from the player a first selected sequence of symbols to be played in a first game move in the computer-implemented game. In some embodiments, the Sequence Generator receives from the player a selected sequence of letters that form a particular word. In other embodiments, the Sequence Generator receives from the player a selected sequence of in-game virtual objects that form a particular combination of virtual objects.

At operation 740, the Sequence Generator identifies a first shared symbol present in both the first selected sequence and the target sequence. In some embodiments, the Sequence Generator identifies a shared letter(s) in the selected sequence that is also present in the target sequence. In other embodiments, the Sequence Generator identifies a shared in-game virtual object(s) in the selected sequence of in-game virtual objects that is also present in the target sequence.

At operation 750, responsive to the identifying the first shares symbol as in operation 740, the Sequence Generator changes the obscured display of the target sequence to reveal the first shared symbol at a first position in the target sequence. In some embodiments, the Sequence Generator changes the obscured display of the target sequence to reveal the shared letter in the target sequence. When all the symbols of the target sequence are concurrently displayed, the Sequence Generator initiates providing an award to the player or allows the player to proceed to a new game level. In other embodiments, the Sequence Generator changes the obscured display of the target sequence to reveal the shared in-game virtual object in the target sequence. When all the in-game virtual objects of the target sequence are concurrently displayed, the Sequence Generator initiates providing an award to the player or allows the player to proceed to a new game level.

Data Flow

Figure 8:
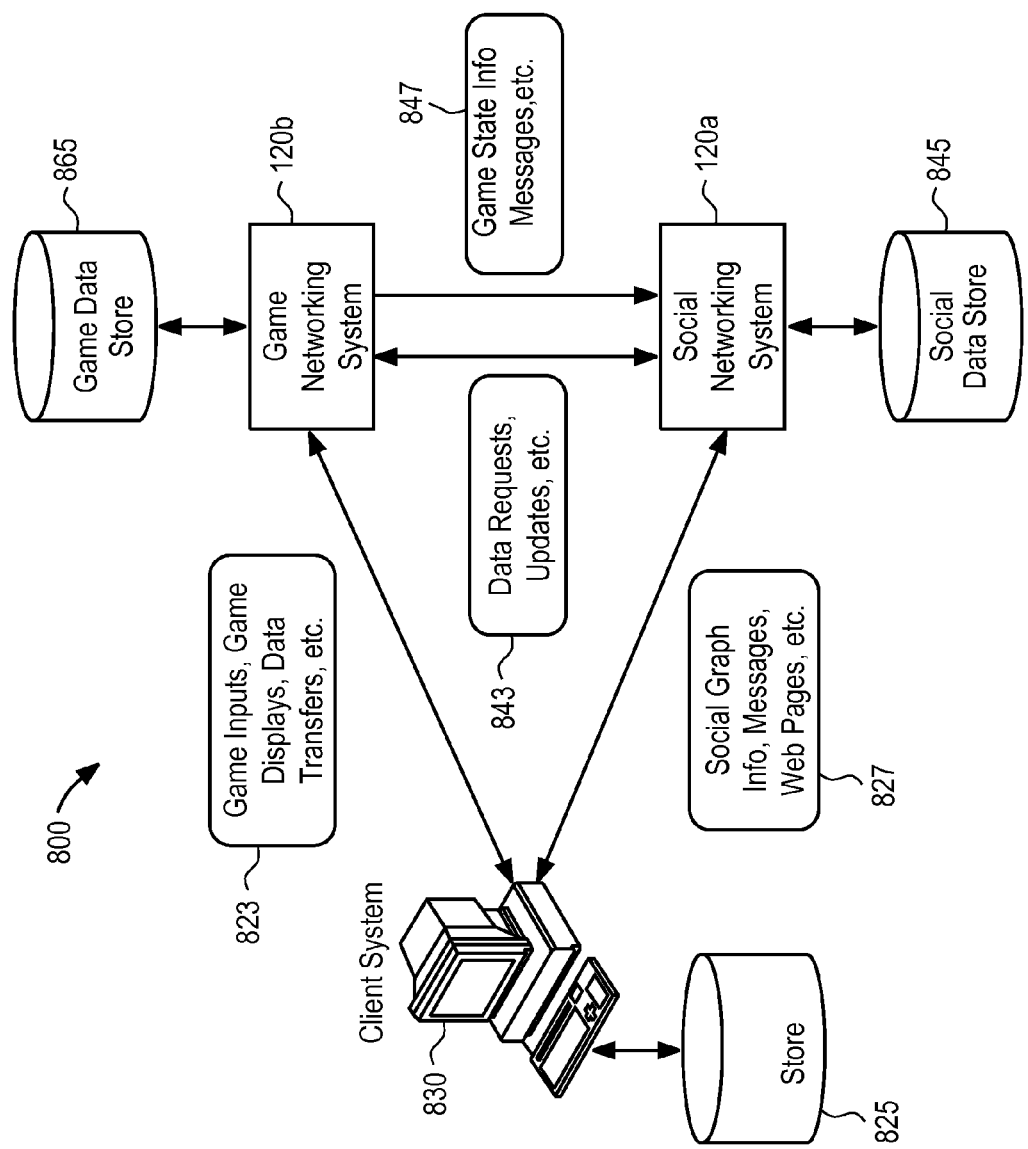
FIG. 8 is a diagrammatic representation of an example data flow between example components of the example system of FIG. 1, according to some example embodiments.

FIG. 8 illustrates an example data flow between the components of system 600. In particular embodiments, system 800 can include client system 830, social networking system 120*a* (i.e. social network system), and game networking system 120*b* (i.e. online game system system). The components of system 800 can be connected to each other in any suitable configuration, using any suitable type of connection. The components may be connected directly or over any suitable network. Client system 830, social networking system 120*a*, and game networking system 120*bb* can each have one or more corresponding data stores such as local data store 835, social data store 845, and game data store 865, respectively. Social networking system 120*a* and game networking system 120*b* can also have one or more servers that can communicate with client system 830 over an appropriate network. Social networking system 120*a* and game networking system 120*b* can have, for example, one or more internet servers for communicating with client system 830 via the Internet. Similarly, social networking system 120*a* and game networking system 120*b* can have one or more mobile servers for communicating with client system 830 via a mobile network (e.g., GSM, PCS, Wi-Fi, WPAN, etc.). In some embodiments, one server may be able to communicate with client system 830 over both the Internet and a mobile network. In other embodiments, separate servers can be used.

Client system 830 can receive and transmit data 823 to and from game networking system 120*b*. This data can include, for example, webpages, messages, game inputs, game displays, HTTP packets, data requests, transaction information, updates, and other suitable data. At some other time, or at the same time, game networking system 120b can communicate data 843, 847 (e.g., game state information, game system account information, page info, messages, data requests, updates, etc.) with other networking systems, such as social networking system 120a (e.g., Facebook, Myspace, etc.). Client system 830 can also receive and transmit data 827 to and from social networking system 120a. This data can include, for example, webpages, messages, social graph information, social network displays, HTTP packets, data requests, transaction information, updates, and other suitable data.

Communication between client system 830, social networking system 120a, and game networking system 120b can occur over any appropriate electronic communication medium or network using any suitable communications protocols. For example, client system 830, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTPS, FTP, SNMP, TELNET, and a number of other protocols, may be used. In some embodiments, no protocol may be used and, instead, transfer of raw data may be utilized via TCP or User Datagram Protocol. In addition, a server in one interaction context may be a client in another interaction context. In particular embodiments, the information transmitted between hosts may be formatted as HyperText Markup Language (HTML) documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 120b, the BLOB containing the game state for the instance corresponding to the player can be transmitted to client system 830 for use by a client-side executed object to process. In particular embodiments, the client-side executable may be a FLASH-based game, which can de-serialize the game state data in the BLOB. As a player plays the game, the game logic implemented at client system 830 maintains and modifies the various game state parameters locally. The client-side game logic may also batch game events, such as mouse clicks, and transmit these events to game networking system 120b. Game networking system 120b may itself operate by retrieving a copy of the BLOB from a database or an intermediate memory cache (memcache) layer. Game networking system 120b can also de-serialize the BLOB to resolve the game state parameters and execute its own game logic based on the events in the batch file of events transmitted by the client to synchronize the game state on the server side. Game networking system 120b may then re-serialize the game state, now modified, into a BLOB and pass this to a memory cache layer for lazy updates to a persistent database.

With a client-server environment in which the online games may run, one server system, such as game networking system 120b, may support multiple client systems 830. At any given time, there may be multiple players at multiple client systems 830 all playing the same online game. In practice, the number of players playing the same game at the same time may be very large. As the game progresses with each player, multiple players may provide different inputs to the online game at their respective client systems 830, and multiple client systems 830 may transmit multiple player inputs and/or game events to game networking system 120b for further processing. In addition, multiple client systems 830 may transmit other types of application data to game networking system 120b.

In particular embodiments, a computed-implemented game may be a text-based or turn-based game implemented as a series of web pages that are generated after a player selects one or more actions to perform. The web pages may be displayed in a browser client executed on client system 830. As an example and not by way of limitation, a client application downloaded to client system 830 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 120a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 830, either caused by an action of a game player or by the game logic itself, client system 830 may need to inform game networking system 120b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 800 is discussed in reference to updating a multi-player online game hosted on a network-addressable system (such as, for example, social networking system 120a or game networking system 120b), where an instance of the online game is executed remotely on a client system 830, which then transmits application event data to the hosting system such that the remote game server synchronizes game state associated with the instance executed by the client system 830.

In particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 830 may include a Flash client. The Flash client may be configured to receive and run Flash application or game object code from any suitable networking system (such as, for example, social networking system 120a or game networking system 120b). In particular embodiments, the Flash client may be run in a browser client executed on client system 830. A player can interact with Flash objects using client system 830 and the Flash client. The Flash objects can represent a variety of in-game objects. Thus, the player may perform various in-game actions on various in-game objects by make various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 830, the Flash client may send the events that caused the game state changes to the in-game object to game networking system 120b. However, to expedite the processing and hence the speed of the overall gaming experience, the Flash client may collect a batch of some number of events or updates into a batch file. The number of events or updates may be determined by the Flash client dynamically or determined by game networking system 120b based on server loads or other factors. For example, client system 830 may send a batch file to game networking system 120b whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 830.

In particular embodiments, the batch file may be a text file and the name-value pairs may be in string format.

In particular embodiments, when a player plays an online game on client system 830, game networking system 120b may serialize all the game-related data, including, for example and without limitation, game states, game events, user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 120b may retrieve the corresponding BLOB from the database to determine the most-recent values of the game-related data. In particular embodiments, while a player is playing the online game, game networking system 120b may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 9:
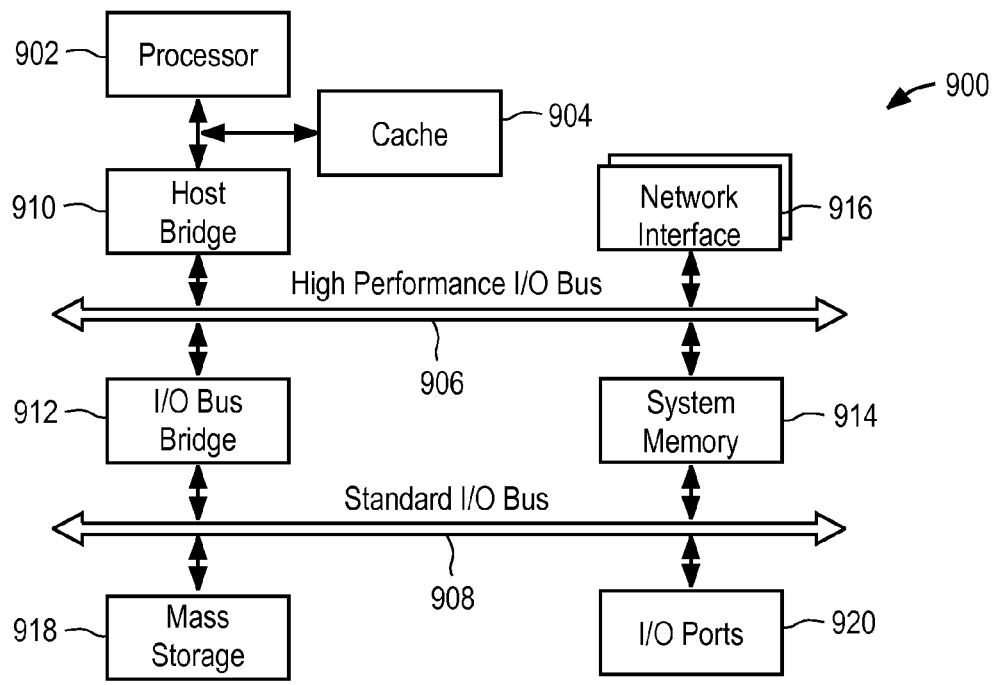
FIG. 9 illustrates an example computing system architecture, which may be used to implement a server or a client system illustrated in FIG. 8, according to some example embodiments.
Figure 10:
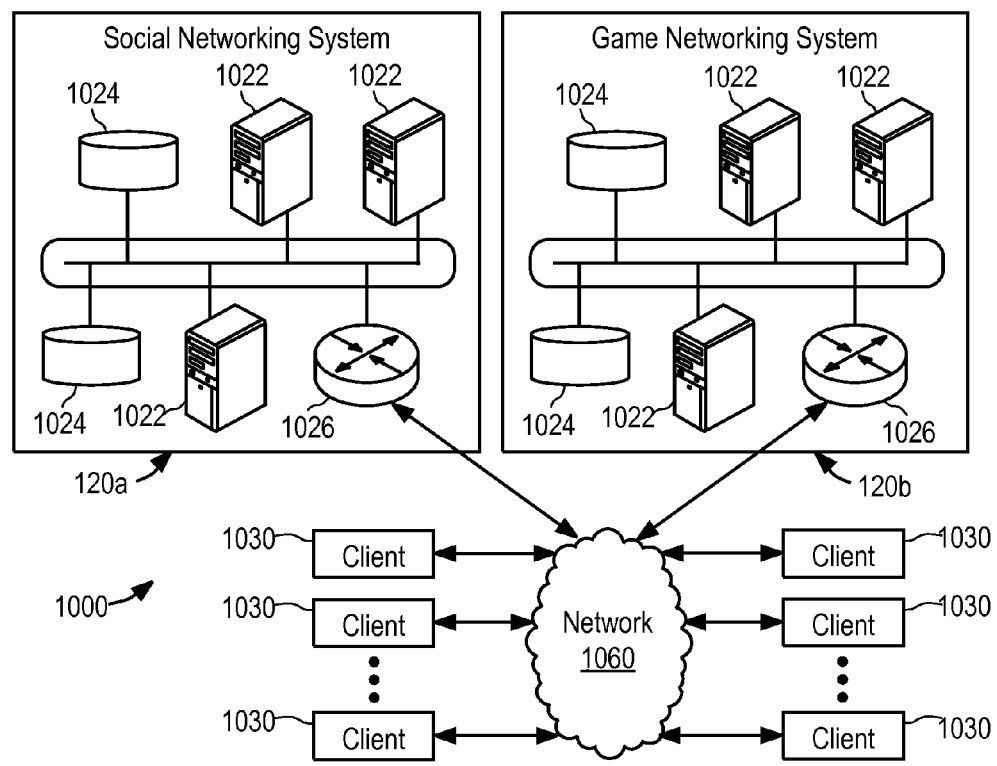
FIG. 10 illustrates an example network environment, in which various example embodiments may operate.

FIG. 9 illustrates an example computing system architecture, which may be used to implement a server 1022 or a client system 1030 illustrated in FIG. 10. In one embodiment, hardware system 900 comprises a processor 902, a cache memory 904, and one or more executable modules and drivers, stored on a tangible computer readable medium, directed to the functions described herein. Additionally, hardware system 900 may include a high performance input/output (I/O) bus 906 and a standard I/O bus 908. A host bridge 910 may couple processor 902 to high performance I/O bus 906, whereas I/O bus bridge 912 couples the two buses 906 and 908 to each other. A system memory 914 and one or more network/communication interfaces 916 may couple to bus 906. Hardware system 900 may further include video memory (not shown) and a display device coupled to the video memory. Mass storage 918 and I/O ports 920 may couple to bus 908. Hardware system 900 may optionally include a keyboard, a pointing device, and a display device (not shown) coupled to bus 908. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 900 are described in greater detail below. In particular, network interface 916 provides communication between hardware system 900 and any of a wide range of networks, such as an Ethernet (e.g., IEEE 802.3) network, a backplane, etc. Mass storage 918 provides permanent storage for the data and programming instructions to perform the above-described functions implemented in servers 1022, whereas system memory 914 (e.g., DRAM) provides temporary storage for the data and programming instructions when executed by processor 902. I/O ports 920 are one or more serial and/or parallel communication ports that provide communication between additional peripheral devices, which may be coupled to hardware system 900.

Hardware system 900 may include a variety of system architectures and various components of hardware system 900 may be rearranged. For example, cache 904 may be on-chip with processor 902. Alternatively, cache 904 and processor 902 may be packed together as a "processor module," with processor 902 being referred to as the "processor core." Furthermore, certain embodiments of the present disclosure may not require nor include all of the above components. For example, the peripheral devices shown coupled to standard I/O bus 908 may couple to high performance I/O bus 906. In addition, in some embodiments, only a single bus may exist, with the components of hardware system 900 being coupled to the single bus. Furthermore, hardware system 900 may include additional components, such as additional processors, storage devices, or memories.

An operating system manages and controls the operation of hardware system 900, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit. Particular embodiments may operate in a wide area network environment, such as the Internet, including multiple network addressable systems.

FIG. 10 illustrates an example network environment, in which various example embodiments may operate. Network cloud 1060 generally represents one or more interconnected networks, over which the systems and hosts described herein can communicate. Network cloud 1060 may include packet-based wide area networks (such as the Internet), private networks, wireless networks, satellite networks, cellular networks, paging networks, and the like. As FIG. 10 illustrates, particular embodiments may operate in a network environment comprising one or more networking systems, such as social networking system 120a, game networking system 120b, and one or more client systems 1030. The components of social networking system 120a and game networking system 120b operate analogously; as such, hereinafter they may be referred to simply at networking system 1020. Client systems 1030 are operably connected to the network environment via a network service provider, a wireless carrier, or any other suitable means.

Networking system 120 is a network addressable system that, in various example embodiments, comprises one or more physical servers 1022 and data stores 1024. The one or more physical servers 1022 are operably connected to computer network 1060 via, by way of example, a set of routers and/or networking switches 1026. In an example embodiment, the functionality hosted by the one or more physical servers 1022 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 1022 may host functionality directed to the operations of networking system 1020. Hereinafter servers 1022 may be referred to as server 1022, although server 1022 may include numerous servers hosting, for example, networking system 1020, as well as other content distribution servers, data stores, and databases. Data store 1024 may store content and data relating to, and enabling, operation of networking system 1020 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 1024 corresponds to one or more of a variety of separate and integrated databases, such as relational databases and object-oriented databases, that maintain information as an integrated collection of logically related records or files stored on one or more physical systems. Structurally, data store 1024 may generally include one or more of a large class of data storage and management systems. In particular embodiments, data store 1024 may be implemented by any suitable physical system(s) including components, such as one or more database servers, mass storage media, media library systems, storage area networks, data storage clouds, and the like. In one example embodiment, data store 1024 includes one or more servers, databases (e.g., MySQL), and/or data warehouses. Data store 1024 may include data associated with different networking system 1020 users and/or client systems 1030.

Client system 1030 is generally a computer or computing device including functionality for communicating (e.g., remotely) over a computer network. Client system 1030 may be a desktop computer, laptop computer, personal digital assistant (PDA), in- or out-of-car navigation system, smart phone or other cellular or mobile phone, or mobile gaming device, among other suitable computing devices. Client system 1030 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 1030 to enter addresses of specific network resources to be retrieved, such as resources hosted by networking system 1020. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 1030 desires to view a particular webpage (hereinafter also referred to as target structured document) hosted by networking system 1020, the user's web browser, or other document Sequence Generator or suitable client application, formulates and transmits a request to networking system 1020. The request generally includes a URL or other document identifier as well as metadata or other information. By way of example, the request may include information identifying the user, such as a user ID, as well as information identifying or characterizing the web browser or operating system running on the user's client computing device 1030. The request may also include location information identifying a geographic location of the user's client system or a logical network location of the user's client system. The request may also include a timestamp identifying when the request was transmitted.

Although the example network environment described above and illustrated in FIG. 10 described with respect to social networking system 120a and game networking system 120b, this disclosure encompasses any suitable network environment using any suitable systems. As an example and not by way of limitation, the network environment may include online media systems, online reviewing systems, online search engines, online advertising systems, or any combination of two or more such systems.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the invention can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A computer-implemented method, comprising:
   generating a target sequence of symbols to be identified by a player in the computer-implemented game;
   generating a first display portion of the computer-implemented game comprising an obscured display of each symbol of the target sequence;
   generating a second display portion of the computer-implemented game comprising one or more symbols, at respective display positions, for selection by the player;
   receiving from the player a first selected sequence of symbols in the second display portion to be played in a first game move in the computer-implemented game;
   in an automated operation using one more processors, identifying a first shared symbol present in both the first selected sequence and the target sequence;
   responsive to the identifying:
      changing the first display portion to concurrently reveal the first shared symbol at a first position in the target sequence while maintaining respective obscured display of each remaining symbol of the target sequence; and
      presenting, in the second display portion, an animation that gradually removes the first shared symbol and shifts a particular symbol from its current display position to the respective display position occupied by the first shared symbol.

2. The computer-implemented method as in claim 1, wherein generating a target sequence of symbols to be identified by a player in the computer-implemented game comprises:

generating a target phrase comprising a plurality of words; and wherein the first selected sequence comprises a word.

3. The computer-implemented method as in claim 1, wherein receiving from the player a first selected sequence of symbols to be played in a first game move in the computer-implemented game comprises:

providing a first reward to the player responsive to determining the first selected sequence of symbol meets a first pre-defined criteria;

removing each respective symbol in the first selected sequence of symbols from the second display portion;

identifying an update symbol for each respective symbol in the first selected sequence of symbols; and inserting each update symbol in the second display portion.

4. The computer-implemented method as in claim 3, wherein changing the first display portion to concurrently reveal the first shared symbol at a first position in the target sequence while maintaining respective obscured display of each remaining symbol of the target sequence comprises:

providing a target reward to the player responsive to revealing a respective position of each symbol in the target sequence.

5. The computer-implemented method as in claim 3, further comprising:

receiving from the player a second selected sequence of symbols in the second display portion to be played in a second game move in the computer-implemented game, the second selection sequence of symbols comprising at least one of the update symbols, the first selected sequence different than the second selected sequence;

providing a second reward to the player responsive to determining the second selected sequence of symbol meets a second pre-defined criteria;

identifying a second shared symbol present in both the second selected sequence and the target sequence; and changing display of the target sequence in the first display portion to reveal the second shared symbol at a second position in the target sequence concurrently with display of the first shared symbol at the first position while maintaining respective obscured display of each remaining symbol of the target sequence.

6. The computer-implemented method as in claim 5, wherein receiving from the player a second selected sequence of symbols comprises:

providing a second reward to the player responsive to determining the second selected sequence of symbols meets a second pre-defined criteria.

7. The computer-implemented method as in claim 1, wherein identifying a first shared symbol present in both the first selected sequence and the target sequence further comprises:

identifying a second shared symbol present in both the first selected sequence and the target sequence; and wherein changing the first display portion further comprises:

concurrently revealing the first shared symbol and the second shared symbol at respective first and second positions in the target sequence.

8. A non-transitory machine-readable storage medium storing instructions which, when executed by one or more processors, cause the one or more processors to perform operations comprising:

generating a target sequence of symbols to be identified by a player in the computer-implemented game;

generating a first display portion of the computer-implemented game comprising an obscured display of each symbol of the target sequence;

generating a second display portion of the computer-implemented game comprising one or more symbols, at respective display positions, for selection by the player;

receiving from the player a first selected sequence of symbols in the second display portion to be played in a first game move in the computer-implemented game;

identifying a first shared symbol present in both the first selected sequence and the target sequence;

responsive to the identifying:

changing the first display portion to concurrently reveal the first shared symbol at a first position in the target sequence while maintaining respective obscured display of each remaining symbol of the target sequence; and presenting, in the second display portion, an animation that gradually removes the first shared symbol and shifts a particular symbol from its current display position to the respective display position occupied by the first shared symbol.

9. The non-transitory machine-readable storage medium as in claim 8, wherein generating a target sequence of symbols to be identified by a player in the computer-implemented game comprises:

generating a target phrase comprising a plurality of words; and wherein the first selected sequence comprises a word.

10. The non-transitory machine-readable storage medium as in claim 8, wherein receiving from the player a first selected sequence of symbols to be played in a first game move in the computer-implemented game comprises:

providing a first reward to the player responsive to determining the first selected sequence of symbol meets a first pre-defined criteria;

removing each respective symbol in the first selected sequence of symbols from the second display portion;

identifying an update symbol for each respective symbol in the first selected sequence of symbols; and inserting each update symbol in the second display portion.

11. The non-transitory machine-readable storage medium as in claim 10, wherein changing the first display portion to concurrently reveal the first shared symbol at a first position in the target sequence while maintaining respective obscured display of each remaining symbol of the target sequence comprises:

providing a target reward to the player responsive to revealing a respective position of each symbol in the target sequence.

12. The non-transitory machine-readable storage medium as in claim 10, further comprising:

receiving from the player a second selected sequence of symbols in the second display portion to be played in a second game move in the computer-implemented game, the second selection sequence of symbols comprising at least one of the update symbols, the first selected sequence different than the second selected sequence;

providing a second reward to the player responsive to determining the second selected sequence of symbol meets a second pre-defined criteria;

identifying a second shared symbol present in both the second selected sequence and the target sequence; and changing display of the target sequence in the first display portion to reveal the second shared symbol at a second position in the target sequence concurrently with display of the first shared symbol at the first position while maintaining respective obscured display of each remaining symbol of the target sequence.

13. The non-transitory machine-readable storage medium as in claim 12, wherein receiving from the player a second selected sequence of symbols comprises:
providing a second reward to the player responsive to determining the second selected sequence of symbol meets a second pre-defined criteria.

14. The non-transitory machine-readable storage medium as in claim 8, wherein identifying a first shared symbol present in both the first selected sequence and the target sequence further comprises:
identifying a second shared symbol present in both the first selected sequence and the target sequence; and
wherein changing the first display portion further comprises:
concurrently revealing the first shared symbol and the second shared symbol at respective first and second positions in the target sequence.

15. A computer system comprising:
a processor;
a memory device holding an instruction set executable on the processor to cause the computer system to perform operations comprising:
generating a target sequence of symbols to be identified by a player in the computer-implemented game;
generating a first display portion of the computer-implemented game comprising an obscured display of each symbol of the target sequence;
generating a second display portion of the computer-implemented game comprising one or more symbols, at respective display positions, for selection by the player;
receiving from the player a first selected sequence of symbols in the second display portion to be played in a first game move in the computer-implemented game;
identifying a first shared symbol present in both the first selected sequence and the target sequence;
responsive to the identifying:
changing the first display portion to concurrently reveal the first shared symbol at a first position in the target sequence while maintaining respective obscured display of each remaining symbol of the target sequence; and
presenting, in the second display portion, an animation that gradually removes the first shared symbol and shifts a particular symbol from its current display position to the respective display position occupied by the first shared symbol.

16. The computer system as in claim 15, wherein generating a target sequence of symbols to be identified by a player in the computer-implemented game comprises:
generating a target phrase comprising a plurality of words; and
wherein the first selected sequence comprises a word.

17. The computer system as in claim 15, wherein receiving from the player a first selected sequence of symbols to be played in a first game move in the computer-implemented game comprises:
providing a first reward to the player responsive to determining the first selected sequence of symbol meets a first pre-defined criteria;
removing each respective symbol in the first selected sequence of symbols from the second display portion;
identifying an update symbol for each respective symbol in the first selected sequence of symbols; and
inserting each update symbol in the second display portion.

18. The computer system as in claim 17, wherein changing the first display portion to concurrently reveal the first shared symbol at a first position in the target sequence while maintaining respective obscured display of each remaining symbol of the target sequence comprises:
providing a target reward to the player responsive to revealing a respective position of each symbol in the target sequence.

19. The computer system as in claim 17, further comprising:
receiving from the player a second selected sequence of symbols in the second display portion to be played in a second game move in the computer-implemented game, the second selection sequence of symbols comprising at least one of the update symbols, the first selected sequence different than the second selected sequence;
providing a second reward to the player responsive to determining the second selected sequence of symbol meets a second pre-defined criteria;
identifying a second shared symbol present in both the second selected sequence and the target sequence; and
changing display of the target sequence in the first display portion to reveal the second shared symbol at a second position in the target sequence concurrently with display of the first shared symbol at the first position while maintaining respective obscured display of each remaining symbol of the target sequence.

20. The computer system as in claim 15, wherein identifying a first shared symbol present in both the first selected sequence and the target sequence further comprises:
identifying a second shared symbol present in both the first selected sequence and the target sequence; and
wherein changing the first display portion further comprises:
concurrently revealing the first shared symbol and the second shared symbol at respective first and second positions in the target sequence.

* * * * *